United States Patent [19]

Takematsu

[11] 4,404,497
[45] Sep. 13, 1983

[54] POWER SUPPLYING APPARATUS

[75] Inventor: Yoshiyuki Takematsu, Tokyo, Japan

[73] Assignee: Fuji Koeki Corporation, Tokyo, Japan

[21] Appl. No.: 140,879

[22] Filed: Apr. 16, 1980

[30] Foreign Application Priority Data

Apr. 21, 1979 [JP] Japan ................. 54/049600

[51] Int. Cl.³ ............................................ H05B 41/32
[52] U.S. Cl. ............................ 315/241 P; 315/209 R; 331/112
[58] Field of Search ............... 315/209 R, 219, 241 P; 331/112; 320/1; 354/145

[56] References Cited

U.S. PATENT DOCUMENTS 4,067,028  1/1978  Lermann et al. ........... 315/241 P X

FOREIGN PATENT DOCUMENTS

53-134930 10/1978 Japan .

Primary Examiner—Eugene R. La Roche
Attorney, Agent, or Firm—Fleit & Jacobson

[57] ABSTRACT

This invention concerns to a power supply arrangement which comprises, substantially, a power source circuit, a voltage converter circuit for converting a direct current voltage from the direct current power source circuit into an alternating current voltage, and a rectifier circuit for rectifying the alternating current voltage to a high direct current voltage to be applied to a load. The voltage converter circuit includes an oscillating transformer and an oscillation switching element. The oscillating transformer is provided with only two windings, and these windings are effectively employed to activate the voltage converter circuit.

12 Claims, 9 Drawing Figures

Fig. 8

POWER SUPPLYING APPARATUS

FIELD OF THE INVENTION

The present invention relates to a power supply arrangement, and more particularly to a power supplying apparatus for use of a direct current load.

BACKGROUND OF THE INVENTION

In a battery operated power supply, a D.C.—D.C. converter is, generally, employed in order to regulate a voltage from a battery. High D.C. voltage is obtained from the battery through the use of a voltage converter. A converter includes a transformer for converting low D.C. voltage to high A.C. voltage, and a rectifier circuit for rectifying the A.C. voltage, the rectified voltage being then applied to a storage capacitor in order to charge it. The power supply of this kind of the load employs a D.C.—D.C. converter which comprises a direct current power source circuit having a battery, a voltage converter circuit for converting a direct current output voltage to an alternating current voltage, a rectifier circuit for rectifying the alternating current voltage into a direct current voltage.

These power supply are, typically, employed in electric flash units. Since an electric flash unit of this type is generally portable, the transformer of the converter circuit is needed to be made small in order to make a power supplying apparatus small and light.

Figure 1:
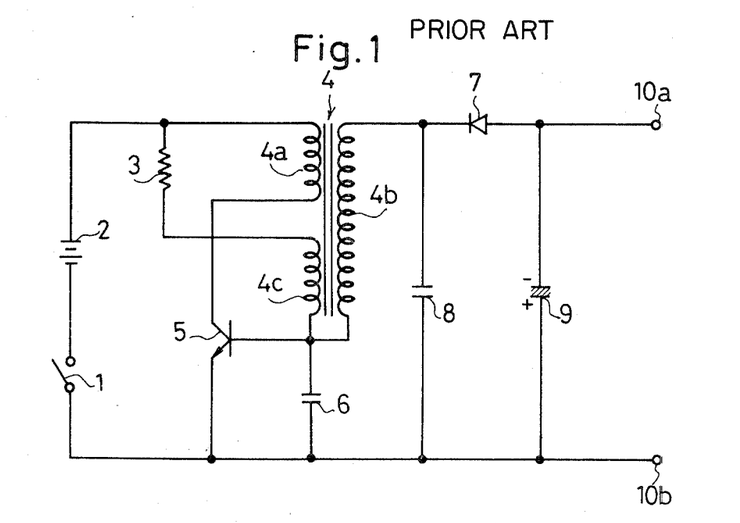
FIG. 1, already referred to above, is circuit diagram of prior art power supplying apparatus.

FIG. 1 shows an example of a prior art power supplying apparatus. The apparatus shown in FIG. 1 comprises a direct current power source circuit including a battery 2 and a power source switch 1 which is connected to the battery 2 in series relationship, a voltage converter circuit comprising an oscillator circuit having an oscillating resistor 3, an oscillating transformer 4, an oscillating switch element in the form of a transistor 5 and an oscillating capacitor 6, a rectifier circuit which includes a diode 7 of which a cathode electrode is connected to one terminal of a secondary winding 4b of the oscillating transformer and a capacitor 8, and an electric charge storing circuit which includes a main storage capacitor 9. In the voltage converter circuit, the oscillating transformer 4 has a primary winding 4a, the secondary winding 4b and a third winding 4c. One terminal of the primary winding 4a is connected to a positive terminal of the battery 2. The other terminal of the primary winding 4a is connected to a collector electrode of the transistor 5. An emitter electrode of the transistor 5 is connected to a negative terminal by way of the power source switch 1. The other terminal of the secondary winding 4b is connected to a base electrode of the transistor 5. The third winding 4c of the oscillating transformer 4 is connected between the positive terminal of the battery 2 and the base electrode of the transistor 5 by way of the oscillating resistor 3. The oscillating capacitor 6 is connected between the base electrode and the emitter electrode of the transistor 5.

In the power supplying apparatus of FIG. 1, when the power source switch 1 is closed, the voltage converter circuit activates an oscillating operation, and thereby the high voltage is induced at the secondary winding 4b of the transformer 4. The boosted alternating current voltage is rectified by the diode 7 of the rectifier circuit, and thereafter electric charge is stored on the main storage capacitor 9 of the electric charge storing circuit. When the electric charge stored on the capacitor 9 reaches a predetermined value, a predetermined voltage appears between output terminals 10a and 10b.

In this known power supplying apparatus, the oscillating transformer 4 is provided with three windings, that is, the primary winding 4a, the secondary winding 4b and further the third winding 4c. Accordingly, the voltage converter circuit of the power supplying apparatus is complicated, and thereby the apparatus becomes complicated and bulky, as well as is expensive.

OBJECT OF THE INVENTION

The primary object of the invention is to provide an improved power supplying apparatus which overcomes the above drawbacks, namely, a power supplying apparatus in which high performance is obtained and the cost is reduced.

More specifically, an object of the present invention is to provide an economical and high performance power supplying apparatus which consume a small amount of an electrical energy to supply to a load circuit, by employing an oscillating transformer having only two windings, and is easy to construct and to operate, and is highly efficient in use.

SUMMARY OF THE INVENTION

According to the present invention there is provided a power supplying apparatus comprising a power supplying apparatus comprising voltage converting means for converting a direct current voltage from a direct current power source into an alternating current voltage, and rectifying means for rectifying said alternating current voltage by said voltage converting means to a direct current voltage, and means for supplying said direct current voltage rectified by said rectifying means to a load circuit means, said voltage converting means comprising an oscillating transformer having a primary winding connected to said direct current power source and a secondary winding electromagnetically coupled to said primary winding, an oscillator circuit means including a switch means for controlling a current flowing in said primary winding of the oscillating transformer, and biasing means for controlling ON and OFF operations of said switch means of the oscillator circuit means

BRIEF DESCRIPTION OF THE DRAWING

Certain embodiments of the invention will now be described by way of examples and with reference to the accompanying drawings, wherein like parts in each of the several figures are identified by the same reference character and wherein.

DETAILED DESCRIPTION OF THE EMBODIMENTS

Figure 2:
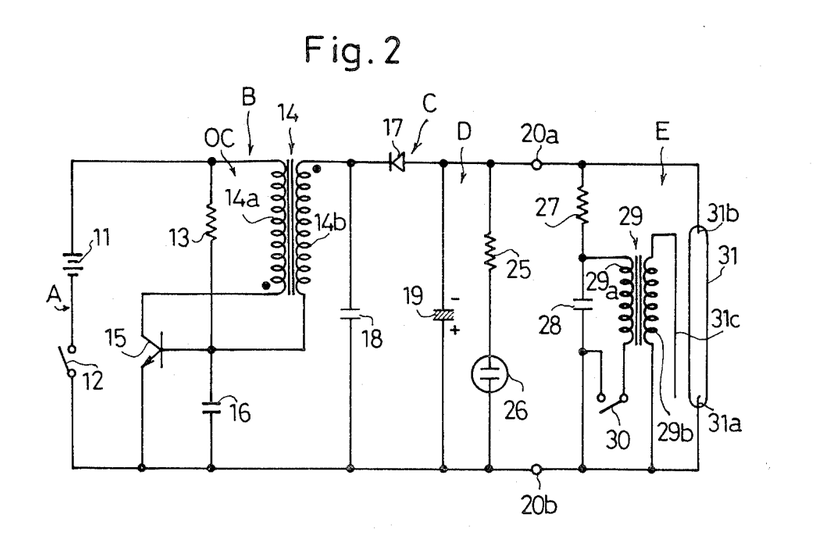
FIG. 2 is a detailed circuit diagram of a power supplying apparatus according to the present invention.

Referring to FIG. 2 of the drawings, there is shown a power supplying apparatus in accordance with the present invention. The power supplying apparatus shown in FIG. 2 comprises a direct-current power source circuit A, a voltage converter circuit B for converting and boosting the voltage from the direct current power source circuit A into alternating current voltage, a rectifier circuit C for rectifying the voltage from the boosted alternating current voltage for the voltage converter circuit B, an electric charge storing circuit D for storing electrical energy supplied in the form of direct current from the rectifier circuit C and for supplying the electric energy to a load circuit member E.

The direct current power source circuit A includes a battery and a power source switch 12 serially connected to the battery 11. The voltage converter circuit comprises, substantially, an oscillator circuit OC and a biassing circuit which includes an oscillating resistor 13 and an oscillating capacitor 16. In more detail, the voltage converter circuit B includes the resistor 13 of which one terminal is directly connected to the positive terminal of the battery 11, a capacitor 16 of which one terminal is connected to other terminal of the resistor 13 to form the biassing circuit, an oscillating transformer 14, and an oscillating element in the form of a high performance silicon transistor 15.

The oscillating transformer 14 consists of a primary winding 14a and a secondary winding 14b. A winding end terminal of the primary winding 14a is directly connected to the positive terminal of the battery 11, and other winding start terminal of the primary winding 14a is connected to a collector electrode in order to form the oscillator circuit OC. One winding end terminal of the secondary winding 14b of the oscillating transformer 14 is connected to a base electrode of the transistor 15.

The rectifier circuit C includes an electric valve in the form of a diode 17 of which the cathode electrode is connected to a winding start terminal of the secondary winding 14b of the transformer 14, and the diode 17 is provided so as to be reverse direction with respect to the polarity of the battery 11. A capacitor 18 is connected between a juncture of the secondary winding 14b of the transformer 14 and the diode 17 of the rectifier circuit C and the positive terminal side of the battery 11.

The electric charge storing circuit D comprises a main storage capacitor 19, a current restricting resistor 25 and an indicating lamp in the form of a neon glow lamp 26 which is connected to the main storage capacitor in parallel by way of the current restricting resistor 25. One terminal of the capacitor 19 is connected to the anode of the diode 17, and other terminal of the capacitor 19 is connected to an emitter electrode of the transistor 15 and to the negative terminal of the battery 11.

The load circuit member E is connected to output terminals 20a and 20b and includes trigger pulse generating circuit means and flash tube circuit means. The trigger pulse generating circuit means has a charging resistor 27 of which one terminal is connected to the one terminal of the main storage capacitor 19, a triggering capacitor 28 of which one terminal is connected to the other terminal of the charging 19, a trigger transformer 29 having a primary winding 29a and a secondary winding 29b and a synchronizing switch 30 which is arranged to be switched ON and OFF in synchronizing with a camera shutter. The primary winding 29a of the transformer 29 is connected between the triggering capacitor 28 and the switch 30. The flash tube circuit means comprises a gas-filled flash tube 31. The flash tube 31 is provided with a pair of main current conducting electrodes 31a, 31b and a trigger electrode 31c which is positioned adjacent but external to the flash tube 31. The trigger electrode 31c is connected to one terminal of the secondary winding 19b of the triggering transformer 19, one main current conducting electrode 19a is connected to other terminal of the secondary winding 29b.

In operation, the power source 12 is manually operated by its ON and OFF starter. When the switch 12 is in its OFF state, the oscillator circuit OC does not also activate its oscillating operation, because the power source current is not supplied to the voltage converter circuit B. By turning the power source switch 12 ON, the base electrode of the transistor 15 is biased to cause the transistor 15 to become conductive, since an electric charge is gradually stored on the capacitor 16 by way of the resistor 13 from the battery 11 and thence a base voltage of the transistor 15 gradually increases to an operating voltage. When the transistor 15 turns ON, a current flows through the primary winding 14a of the oscillating transformer 14, the collector-emitter path of the transistor 4 from the battery 11 and the boosted high alternating current voltage is produced from the secondary winding 4b of the oscillating transformer 14. In this case, the oscillating voltage due to the stray capacity of the windings of the transformer 14 or the oscillating capacitor 16 is also employed to make the oscillating transistor 15 ON and OFF operation. In more detail, magnetic flux of the transformer 14 gradually increases by commencement of oscillating operation of the oscillator circuit OC. When the magnetic flux density reaches a predetermined value and the magnetic flux is saturated, the current flowing through the primary winding 14a of the oscillating transformer 14 is suddenly decreased, and thereby potential at the transistor 15 becomes lower than the operating voltage and the transistor 15 becomes nonconductive. In the oscillating transformer 14, energy stored in a core by electro-magnetically transferred to the secondary winding 14b due to the decrement of the current flowing in the primary winding 14a.

As each winding of the oscillating transformer 14 is wound such that the base current increases, the transistor 15 becomes conductive by means of positive feedback operation of the transformer 14. By ON and OFF operations of the transistor 15, the voltage converter circuit B commences the oscillation and produces high alternating current voltage from the secondary winding 14b. The high alternating current voltage is rectified by the diode 17 of the rectifier circuit C, to produce a high direct current voltage.

The main storage capacitor 19 is charged by the high D.C. voltage from the rectifier circuit C. When the main storage capacitor 19 is fully charged up to the predetermined voltage, the neon glow lamp 26 lights indicating that the device is in readiness for the flash tube 31 to be fired. The flash tube 31 may then be fired by closing of the camera shutter switch 30. It will be readily appreciated that this closing need only be momentary during the actuation of the camera shutter.

By closing the switch 30, the electric charge on the triggering capacitor 28 discharges through the switch 28 and the primary winding 29a. Then high voltage pulse is induced at the secondary winding 29b of the triggering transformer 29. The high voltage thus induced in the secondary winding 29b of the transformer 29 appears at the trigger electrode 31c of the flash tube 31 and ionizes a portion of the gas in the flash tube. The main storage capacitor 19 then discharges across the gas between the main current conducting electrodes, producing a brilliant flash of illumination. After the main storage capacitor 19 has been discharged, the power source circuit A builds up the charge again in preparation for the next flash.

According to the apparatus of FIG. 2, the cost of the apparatus is reduced, and further, the size of the apparatus is reduced because an oscillating transformer having only two windings is used in a converter circuit.

Figure 3:
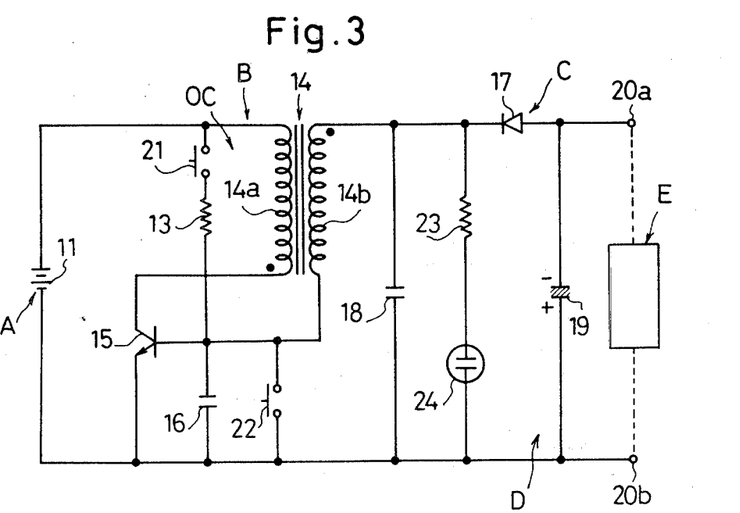
FIG. 3 is a detailed circuit diagram of another power supplying apparatus according to the present invention.

FIG. 3 is illustrative of other embodiment of the present invention, and the power supplying apparatus shown comprises, similar to the apparatus of FIG. 2, a power source circuit A, a voltage converter circuit B, a rectifier circuit C, an electric charge storing circuit D. The difference from the apparatus of FIG. 2 is that the voltage converter circuit B comprises a biassing circuit, an oscillator circuit OC, an oscillation starting means and an oscillation stopping means, and that the direct current power circuit A includes only a battery 11.

More specifically, in the apparatus of FIG. 3, the direct current power source circuit A includes only the battery 10, and does not include a power source switch. The voltage converter circuit B includes an oscillating transformer 14 having a primary winding 14a and a secondary winding 14b, an oscillating capacitor 16, an oscillation switching element in the form of a high performance silicon transistor 15, an oscillating resistor 13, an oscillation starting switch in the form of a mechanical switch 21 connected to the resistor 13 to form an oscillation starting circuit and an oscillation stopping switch in the form of a normally opened push button switch 22 which is connected between a base electrode and an emitter electrode of the oscillating transistor 15, in order to stop the oscillation of the oscillator circuit OC.

The oscillating transistor 15 is of a high performance NPN type, as is explained hereinabove, and has high internal resistance. Accordingly, the leakage current is extremely small and is almost zero in comparison with that of the Germanium transistor. The current which flows in a collector-emitter path of the transistor 15 is less than 0.1 µA, when the transistor 15 is cut-off state. It is, therefore, unnecessary to provide the power source switch in the power source circuit A.

The power supplying apparatus of FIG. 3 is further provided with a surge absorbing circuit means. The surge absorbing circuit comprises a capacitor 18 which is connected to the secondary winding 14b of the transformer 14, a current restricting resistor 23 and an indicating lamp in the form of a neon glow lamp 24 which is connected to the capacitor 18 in parallel by way of the current-restricting resistor 23.

In accordance with the power supplying apparatus shown in FIG. 3, the oscillation starting switch 21 is manually actuated between its ON and OFF starter. When the switch 15 is in its OFF state, the oscillator circuit OC does not initially activate its oscillating operation, because the transistor 15 is non-conductive state. By turning the switch 21 instantaneously ON, the base electrode of the transistor 15 to become conductive to begin the oscillation of the oscillator circuit OC. By the oscillating operation of the oscillator circuit OC, an alternating current voltage is induced at the secondary winding 14b of the oscillating transformer 14. The induced voltage at the secondary winding 14b is rectified by the diode 17 of the rectifer circuit C, and thereby a direct current flows in in order to charge the electric charge on a main storage capacitor 19 by way of the diode 17, the secondary winding 14b.

The capacitor of the surge absorbing circuit makes a reverse voltage generated at the secondary 11b small and compensates a signal by absorbing the surge voltage. The voltage induced on the capacitor 18 is applied to the neon glow lamp 24 through the resistor 23, and thereby the neon glow lamp 24 illuminates so that the oscillation of the oscillator circuit OC may be confirmed by the illumination of the neon glow lamp 24. The inactivation of the oscillator circuit OC may also be confirmed when the neon glow lamp 24 does not illuminate.

Next, the OFF operation of the voltage converter circuit B will be described specifically hereinbelow. A current has initially flowed through the main storage capacitor 19 by way of the diode 17, the secondary winding 14b of the transformer 14 and the base-emitter path of the transistor 14 and, at the same time, the diode 17, the capacitor 16 when the oscillator circuit OC activates the oscillating operation. The current flowing through the main storage capacitor 19 generally decreased as the electric charge is stored on the main storage capacitor 19. When the current of the capacitor 19 decreases, the base current of the oscillating transistor 15 is also decreases, and thereby the current of the primary winding 14a of the transformer 14 from the battery 11 is automatically interrupted by the transistor 15, because the base current of the transistor 15 decreases less than the current required for switching operation.

Under these conditions, although the oscillation of the oscillator circuit OC is stopped automatically as the main storage capacitor 19 is charged up, the operation of the oscillator circuit OC is positively and swiftly stopped by closing the oscillation stopping switch 22, because the oscillating capacitor 16 is short-circuited by the switch 22. Under these conditions, the leakage current is less than 0.1 micro-ampere, and a power source switch is unnecessary in the power source circuit A.

According to the power supplying apparatus of FIG. 3, the oscillating operation of the oscillator circuit OC can be ceased fastly by closing the oscillation stopping switch 22 before it is automatically stopped. In addition, the switch 22 is effective to use in a circuit in which the oscillation is not stopped automatically, particularly when an oscillating current in the oscillator circuit OC does not damping due to the large magnitude of the load current.

Figure 4:
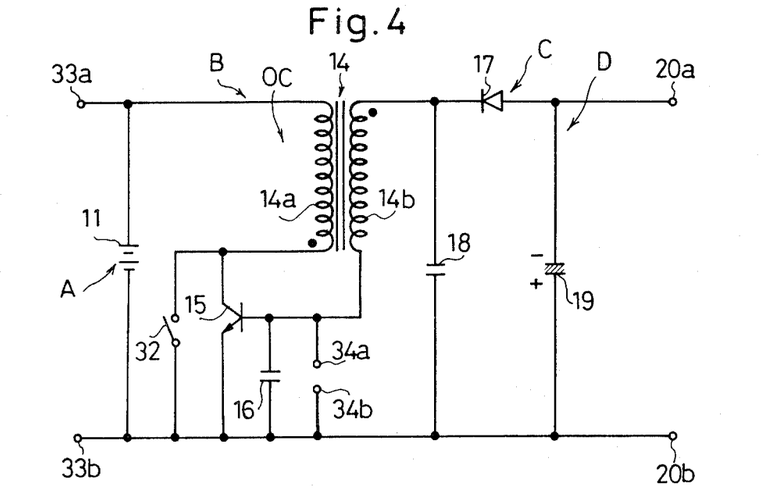
FIG. 4 is a detailed circuit diagram of a power supplying apparatus according to the present invention.

FIG. 4 shows one possible embodiment of the power supplying apparatus in accordance with the present invention. In the apparatus shown in FIG. 4, a voltage converter circuit B comprises an oscillating transformer 14 having a primary winding 14a and a secondary winding 14b, an oscillating switching element in the form of an NPN type silicon transistor 15, an oscillating capacitor 16 and an oscillation stopping switch 32. A winding end terminal of the primary winding 14a is directly connected to a positive terminal of a battery 11. A collector electrode of the transistor 15 is connected to a winding start terminal of the primary winding 14a. An emitter electrode of the transistor 15 is directly connected to a negative terminal of the battery 11. A winding end terminal of the secondary winding 14b is connected to a base electrode of the transistor 15. The oscillating capacitor 16 is connected between the base electrode and the emitter electrode of the transistor 15. The oscillation stopping switch 32 is connected in parallel to a collector-emitter path of the transistor.

Operations will be described on the bases of the experimental data. In the apparatus of FIG. 4, a power source voltage of the battery 11 was set to 3 V. Number of turns of the primary winding 14a was set to 20, and number of turns of the secondary winding 14b was set to 1,100. Capacity of the oscillating capacitor 16 was 0.01 μF, and capacity of a capacitor 18 was 100 pF and capacity of a main storage capacitor 19 was 300 μF. Under these conditions, a voltage induced between terminals 33a and 33b was measured by an oscilloscope, and a voltage induced between terminals 34a and 34b was also measured by the oscilloscope.

Figure 5A:
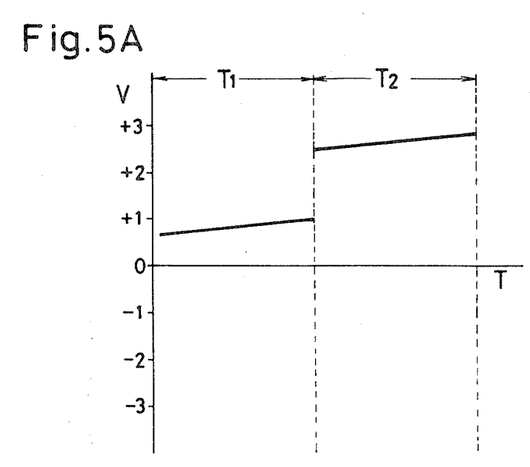
FIGS. 5A and 5B are graph showing operations of the apparatus of FIG. 4.
Figure 5B:
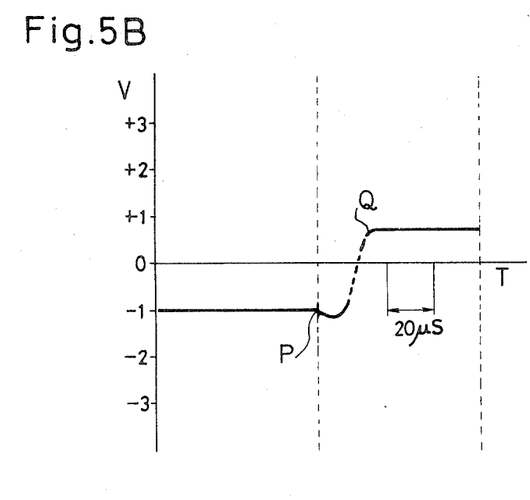

FIGS. 5A and 5B show experimental data. In these figures, $T_1$ shows a time interval during the switch 32 is closed, and $T_2$ shows a time interval during the switch is OFF state. When the switch 32 was closed, the voltage between terminals 33a and 33b was about +1 volt as is shown in FIG. 5A, and voltage between terminals 34a and 34b, that is a base voltage of the transistor 15, was about −1 volt. When the switch 32 was opened, about +3 volt of the voltage appeared between the terminals 33a and 33b as is shown in FIG. 5A, and, at the same time, the voltage between the terminals 34a and 34b was about 0.5 volts as is shown in FIG. 5B.

The switch 32 became ON state at point P, and the transistor became conductive at point Q.

As is apparent from the above experimental data, positive voltage is supplied to the base electrode of the transistor 15, immediately after the switch 32 is changed to the OFF state from the ON state, as is best shown in FIG. 5B. It is, accordingly, apparent that the oscillating operation of the converter circuit B is continued by the application of the positive voltage to the base electrode of the transistor 15.

Figure 6:
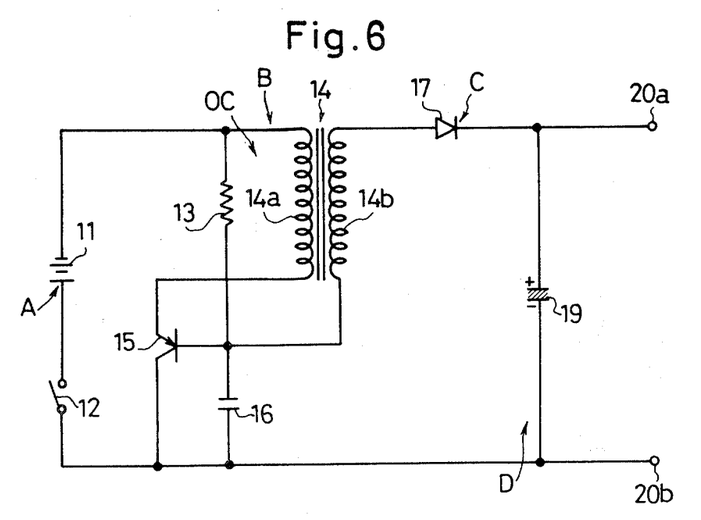
FIG. 6 is a detailed circuit diagram of a modification of the apparatus of the present invention.

FIG. 6 is illustrative of the power supplying apparatus of the present invention. In the apparatus shown in FIG. 6, a PNP type transistor 15a is employed as an oscillating switch element. An emitter electrode of the transistor 15a is connected to a negative terminal of a battery 11 through a primary winding 14a, and a collector electrode of the transistor 15a is connected to a positive terminal of the battery 11 by way of a power source switch. And other elements are connected as shown in the drawing.

Figure 7:
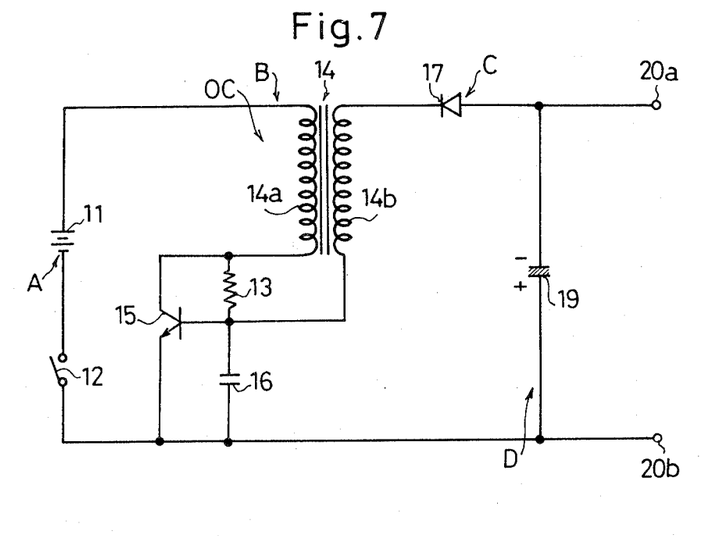
FIG. 7 is a detailed circuit diagram of further power supplying apparatus according to the present invention.

FIG. 7 is an illustrative of the power supplying apparatus which embodies the present invention. In the embodiment of FIG. 7, the voltage converter circuit B also comprises an oscillator circuit OC and a biassing circuit means. The biassing circuit means comprises an oscillating resistor 13 connected between a primary winding 14a and a base electrode of an oscillating transistor 15, and an oscillating capacitor 16 connected between the base electrode and an emitter electrode of the transistor 15.

According to the power supplying apparatus of FIG. 7, an electric charge is supplied to the capacitor 16 by the current flowing through the primary winding 14a of the oscillating transformer 14 and the resistor 14, when a power source switch is closed. When the charging voltage attains to a predetermined value, the transistor 15 is biased to be ON state. By turning the transistor 15 to be conductive, full current flows through the primary winding 14a, and thereby high voltage is induced in a secondary winding 14b by the magnetic coupling operation. The boosted alternating current in the secondary winding 14b is rectified by a diode 22 of a rectifier circuit C. The rectified voltage by the rectifier circuit C charges a main storage capacitor 19 of an electric charge storing circuit D to produce a predetermined voltage in output terminals 20a and 20b.

Figure 8:
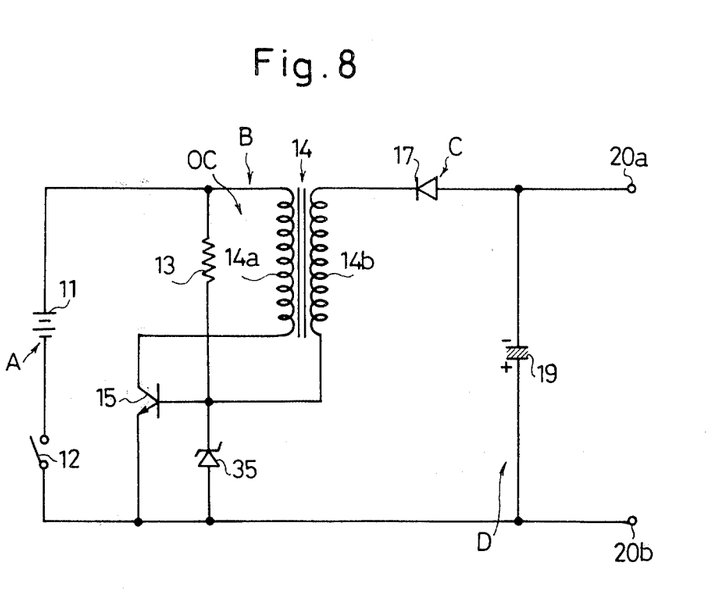
FIG. 8 is a detailed circuit diagram of yet another power supplying apparatus according to the present invention.

FIG. 8 shows an over more effective power supplying apparatus according to the present invention. The power supplying apparatus also comprises a direct-current power source circuit A, a voltage converter circuit B and an electric charge storing circuit D which includes a main storage capacitor 19.

In the power supplying apparatus of FIG. 8, the voltage converter circuit B comprises an oscillator circuit OC and a biassing circuit means. The oscillator circuit OC includes an oscillating transformer 14 consisting of a primary winding 14a and a secondary winding 14b, and an oscillation switching element in the form of a high performance silicon transistor 15. The biassing circuit means comprises an oscillating resistor 13 and a reverse voltage absorbing element in the form of a Zener diode 35. Each of one terminals of the resistor 13 and the primary winding 14a is directly connected to a positive terminal of a battery 11. Other terminal of the secondary winding 14a is connected to a collector electrode of the transistor 15, and other terminal of the resistor 13 is connected to a base electrode of the transistor 15, together with a secondary winding 15b of the transformer 14. The Zener diode 35 is employed in stead of an oscillating capacitor and is connected between the base electrode and an emitter electrode of the transistor 15.

The Zener diode 35 serves as a reverse voltage absorbing element for absorbing the reverse voltage applied to the base electrode of the transistor 15 from the secondary winding 14b of the transformer 14. Accordingly, destroyment of the transistor 15 due to the application to the base is prevented by means of the Zener diode 35. A usual switching diode and the like may also be employed in stead of the Zener diode, as the reverse voltage absorbing element.

In view of the above, it will be seen that the several objects of the invention are achieved and other advantageous results are attained.

While preferred embodiments of the invention have been shown and described, it will be apparent to those skilled in the art that modifications can be made without departing from the principle and spirit of the invention, the scope of which is defined in the appended claims. Accordingly, the foregoing embodiments are to be considered illustrative, rather than restricting of the invention and those modifications which come within the meaning and range of equivalency of the claims are to be included herein.

What is claimed is:

1. A power supplying apparatus, comprising:
   a direct current power source for providing a direct current voltage;
   voltage converting means for converting said direct current voltage from said direct current power source into an alternating current voltage;

rectifying means for rectifying said alternating current voltage provided by said voltage converting means to provide a direct current voltage;
a load circuit; and
means for supplying said direct current voltage provided by said rectifying means to said load circuit;
said voltage converting means comprising an oscillating transformer having a primary winding connected to said direct current power source for receiving a flow of current, and a secondary winding electromagnetically coupled to said primary winding, an oscillator circuit connected to said oscillating transformer and including switch means for controlling the current flowing in said primary winding of the oscillating transformer, and biassing means for controlling said switch means of the oscillator circuit;
wherein said switch means comprises a transistor having a collector-emitter circuit connected to said direct current power source via said primary winding, said transistor also having a base electrode, said biassing means comprising a resistor directly connecting said base electrode to a first terminal of said direct current power source, said resistor being directed connected to said base electrode to form a junction therebetween, said junction being directly connected to a first terminal of said secondary winding;
said apparatus further comprising a stabilizing capacitor connected between a second terminal of said secondary winding and a second terminal of said direct current power source.

2. A power supplying apparatus as claimed in claim 1, wherein said load circuit includes an electric charge storing means for storing the direct current voltage provided by said rectifying means.

3. A power supplying apparatus as claimed in claim 1, wherein said biassing means further comprises a capacitor connected between said base electrode of said transistor and said second terminal of said direct current power source.

4. A power supplying apparatus as claimed in claim 3, further comprising an oscillation starting switch element connected in series with said resistor.

5. A power supplying apparatus as claimed in claim 3, further comprising an oscillation stopping switch element connected in parallel with said capacitor.

6. A power supplying apparatus as claimed in claim 1, wherein said transistor comprises a high leakage resistance switching element which functions as a high resistance when being nonconductive.

7. A power supplying apparatus as claimed in claim 1 wherein said load circuit includes a triggering pulse, generating circuit for generating a trigger pulse and a flash tube circuit member comprising a flash tube to be triggered by said trigger pulse.

8. A power supplying apparatus as claimed in claim 1, said load circuit including a main storage capacitor having a charging condition for being charged by said direct current voltage provided by said rectifying means, and an indicating lamp for indicating said charging condition of said main storage capacitor.

9. A power supplying apparatus as claimed in claim 1, wherein said resistor is also connected between said primary winding of the transformer and the base electrode of said transistor, and said biassing means further comprises a capacitor connected between said base electrode and said collector-emitter circuit of said transistor.

10. A power supplying apparatus as claimed in claim 1, wherein said biassing means includes a reverse voltage absorbing element for absorbing a reverse voltage applied to the base electrode of said transistor.

11. A power supplying apparatus as claimed in claim 10, wherein said reverse voltage absorbing element comprises a Zener diode.

12. A power supplying apparatus as claimed in claim 10, wherein said reverse voltage absorbing element comprises a switching diode.

* * * * *